United States Patent
Fuks et al.

(10) Patent No.: US 12,353,777 B2
(45) Date of Patent: Jul. 8, 2025

(54) COMPUTERIZED SYSTEMS AND METHODS FOR DYNAMICALLY CONTROLLING PRINTERS AND MANAGING PRINTING TASKS ASSOCIATED WITH A MULTI-DISPLAY DEVICE

(71) Applicant: COUPANG CORP., Seoul (KR)

(72) Inventors: Pavel Fuks, Seoul (KR); Yimin Sang, Shanghai (CN); Li Cheng, Shanghai (CN); Mingzhu Gu, Shanghai (CN); Ziliang Mao, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 18/237,741

(22) Filed: Aug. 24, 2023

(65) Prior Publication Data
US 2024/0329898 A1 Oct. 3, 2024

Related U.S. Application Data

(63) Continuation-in-part of application No. 18/194,830, filed on Apr. 3, 2023.

(51) Int. Cl.
G06F 3/12 (2006.01)
(52) U.S. Cl.
CPC .......... *G06F 3/1256* (2013.01); *G06F 3/1204* (2013.01); *G06F 3/1263* (2013.01);
(Continued)
(58) Field of Classification Search
None
See application file for complete search history.

(56) References Cited

U.S. PATENT DOCUMENTS

2003/0078965 A1* 4/2003 Cocotis ............... H04L 67/567
709/203
2017/0217225 A1* 8/2017 Bouwmans ............ B65H 39/10
(Continued)

FOREIGN PATENT DOCUMENTS

CN 114415987 * 4/2022
CN 114415987 A 4/2022
(Continued)

OTHER PUBLICATIONS

International Search Report and Written Opinion in counterpart PCT Application No. PCT/IB2023/061577 dated Feb. 20, 2024, (11 pages).
(Continued)

*Primary Examiner* — Akwasi M Sarpong
*Assistant Examiner* — Pawan Dhingra
(74) *Attorney, Agent, or Firm* — Finnegan, Henderson, Farabow, Garrett & Dunner, LLP

(57) ABSTRACT

Computer-implemented systems and methods for dynamically managing printing service from a multi-display device are disclosed to include a first and second software interface and at least one printer. The processors are instructed to establish and maintain a printing task queue storing printing tasks for each of the at least one printer, receive a printing task from the first software interface associated with a first timestamp, determine a printer for the printing task, disable write access to the printing task queue of the printer from the second software interface, add the first printing task to the printing task queue of the printer; re-enabling the write access to the printing task queue of the printer from the second software interface, and printing a current printing task from the printer, the current printing task is a printing task in the printing task queue of the printer with an earliest timestamp.

18 Claims, 8 Drawing Sheets

(52) U.S. Cl.
CPC .......... *G06F 3/1268* (2013.01); *G06F 3/1274* (2013.01); *G06F 3/1275* (2013.01); *G06F 3/1285* (2013.01)

(56) References Cited

U.S. PATENT DOCUMENTS

| | | | | |
|---|---|---|---|---|
| 2018/0075709 A1* | 3/2018 | Watanabe | ................ | G07G 1/12 |
| 2018/0261052 A1* | 9/2018 | Iwamoto | ................ | G07G 1/06 |
| 2019/0236889 A1* | 8/2019 | Gotanda | ................ | G07F 9/04 |

FOREIGN PATENT DOCUMENTS

| | | |
|---|---|---|
| JP | 2019206146 A | 12/2019 |
| TW | 201446480 A | 12/2014 |
| TW | I508515 B | 11/2015 |
| TW | I532360 B | 5/2016 |
| TW | I558540 B | 11/2016 |
| TW | 202013184 A | 4/2020 |
| TW | I755884 B | 2/2022 |
| TW | I779759 B | 10/2022 |

OTHER PUBLICATIONS

Search Report in counterpart Taiwan Patent Application No. 112147693, Nov. 10, 2024, (received Nov. 21, 2024), 1 page.

\* cited by examiner

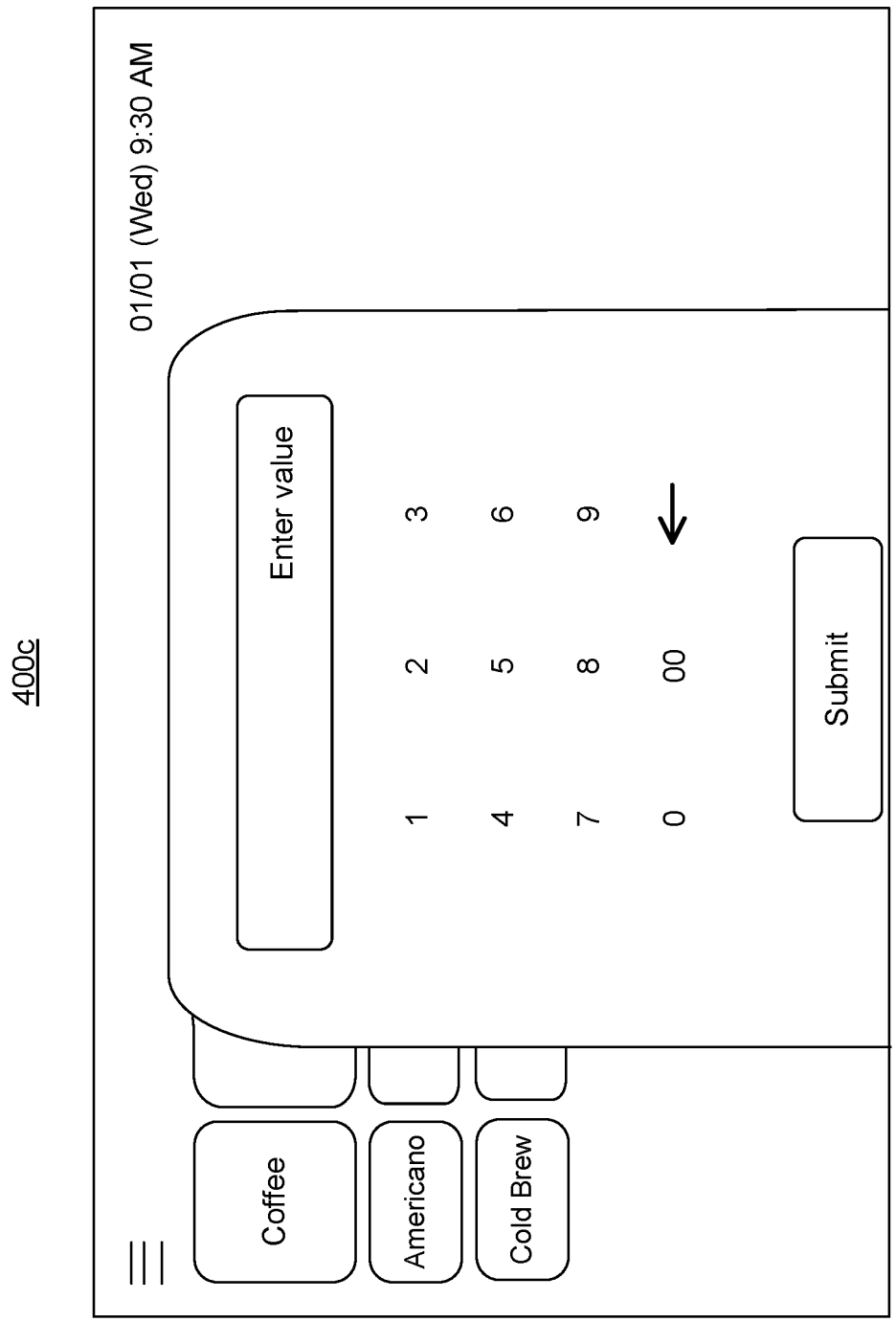

ers and managing printing tasks associated with a multi-display device

RELATED APPLICATIONS

This application is a continuation-in-part of U.S. patent application Ser. No. 18/194,830, filed on Apr. 3, 2023. The contents of the parent application are herein incorporated by reference in their entirety.

TECHNICAL FIELD

The present disclosure generally relates to computerized systems and methods for dynamically controlling printers and managing printing tasks associated with a multi-display device such as a point-of-sale (POS) device. In particular, some embodiments of the present disclosure relate to inventive and unconventional systems for dynamically replacing continuous input elements with discrete input elements based on inputs received by a multi-display POS device, resulting in a system capable of processing inputs received from multiple touch screens being used at the same time using only a single computer.

BACKGROUND

Point-of-sale (POS) technology enables customers to place orders and enables merchants to accept orders. For example, a POS device may display several options that may be selectable via touch inputs and/or inputs received from one or more input/output (I/O) devices, such as a keyboard or pointing device, connected to the POS device. On the customer side, a POS device may display several items that the customer can select from and may further present payment options and steps for completing a transaction. On the merchant side, a POS device may display similar options to that of the customer side, but may also include options for accepting and denying online orders, such as pick-up and delivery orders, and editing current orders.

Conventional POS devices may be in the form of a kiosk or a tablet, wherein the former may allow for separating a customer zone from a merchant zone, and the latter may allow for using only a single computing device to perform both customer and merchant functions. However, kiosks are often implemented as standalone devices that require using separate computers for customers and merchants, which can raise costs, require more computational resources, and necessitate internetworking or other communication systems to allow the customer POS device to communicate with the merchant POS device. Tablets, while they may require less computational resources than systems that use kiosks, may reduce an efficiency as customer and merchant functions are asynchronously performed on a single display. Therefore, when customer functions are being performed on the display, such as to make a payment, the merchant cannot perform other merchant functions, such as accepting delivery orders, unless there is another computer, which cancels out the benefit of using a tablet POS device for reduced computational resources.

Moreover, because the printing speed of printers may be a bottleneck of the operation throughput, there can be a slow-down in operations when multiple users are submitting printing tasks using different displays within a short period of time, especially when the printing tasks are being assigned or routed to a same printer. For example, the later submitted printing task may not be printed due to lack of printing capability. Additional POS devices also increase complexity in network design (e.g., by requiring additional infrastructure to account for the POS devices at a merchant location, by requiring additional resources to account for multiple POS devices on the printing side, or the like.

A possible solution to such problems is to use a single computer connected to multiple displays, such as a touch screen for the merchant and a touch screen for the customer. However, certain operating systems are incompatible with multiple inputs occurring simultaneously or semi-simultaneously, particularly with input elements that require continuous focus, such as text input fields. For example, with a text input field, focus on the text input field can be lost if an interaction, such as a click or touch, is performed on anywhere other than the text input field. Therefore, if a customer touches the customer touch screen while the merchant is entering text using a virtual or physical keyboard into a text input field displayed on the merchant touch screen, focus on the text input field will be lost and subsequent text entered by the merchant will be fed somewhere other than the text input field.

One particular challenge arises for devices in serial communication via serial ports is that information transfers in or out through a serial port sequentially one bit at a time. Throughout most of the history of personal computers, data has been transferred through serial ports to devices such as modems, terminals, various peripherals (e.g., printers) and directly between computers. While parallel connections have advantages (e.g., more data per clock cycle), serial connections can be clocked faster and achieve a higher data rate. They are therefore useful in certain settings and are still used widely. Moreover, many operating systems and/or peripherals may only support serial communications.

One other disadvantage of serial connections is that many operating systems and/or peripherals only allow for simultaneous connections with a single piece of software at a time. This prevents, for example, a single computer from allowing two programs to access the same device simultaneously. To do so requires either tearing down a connection between a device and a first program before creating a new connection between the device and a second program, which leads to inefficient operations.

Therefore, there is a need to make arrangements to the multi-display system, especially when running on systems with serial links to functional peripherals, so that inputs from the multiple displays may be processed and managed efficiently.

There is also a need for improved systems and methods for dynamically controlling inputs and modifying user interface elements associated with a multi-display device, such as a point-of-sale (POS) device, such that a single computer may successfully process inputs received from multiple touch screens being used at the same time.

There is also a need for improved systems and methods for managing printing tasks by the multi-display device, such that a single computer with at least one printer may successfully process multiple printing tasks submitted by multiple displays being used at the same time, and that the single computer may intelligently assign printing tasks to printers according to a set of preset rules.

SUMMARY

One aspect of the present disclosure is directed to a computer-implemented system comprising one or more memory devices storing instructions, a first touch display configured to receive one or more touch inputs, a second touch display configured to receive one or more touch inputs, and one or more processors, communicatively coupled to the first touch display and the second touch display, configured to execute the instructions to perform a method for dynamically controlling a multi-display device. The method includes receiving a first input via the first touch display, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input.

Another aspect of the present disclosure is directed to a method for dynamically controlling a multi-display device. The method includes receiving a first input via the first touch display, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input.

Yet another aspect of the present disclosure is directed to a computer-implemented system comprising one or more memory devices storing instructions, a first touch display configured to receive one or more touch inputs, a second touch display configured to receive one or more touch inputs, and one or more processors, communicatively coupled to the first touch display and the second touch display, configured to execute the instructions to perform a method for dynamically controlling a multi-display device. The method includes receiving a first input, in response to receiving the first input, enabling a first input mode by replacing one or more continuous input elements with one or more discrete input elements for display on at least one of the first touch display or the second touch display, receiving a second input associated with the second touch display, determining whether the first input mode is enabled, and in response to determining that the first input mode is enabled, denying the second input. The method further includes detecting a trigger event, and in response to detecting the trigger event, disabling the first input mode.

Other systems, methods, and computer-readable media are also discussed herein.

BRIEF DESCRIPTION OF THE DRAWINGS

FIGS. 4B and 4C depict exemplary user interfaces displayed in a point-of-sale (POS) mode, consistent with the disclosed embodiments.

DETAILED DESCRIPTION

Figure 1:
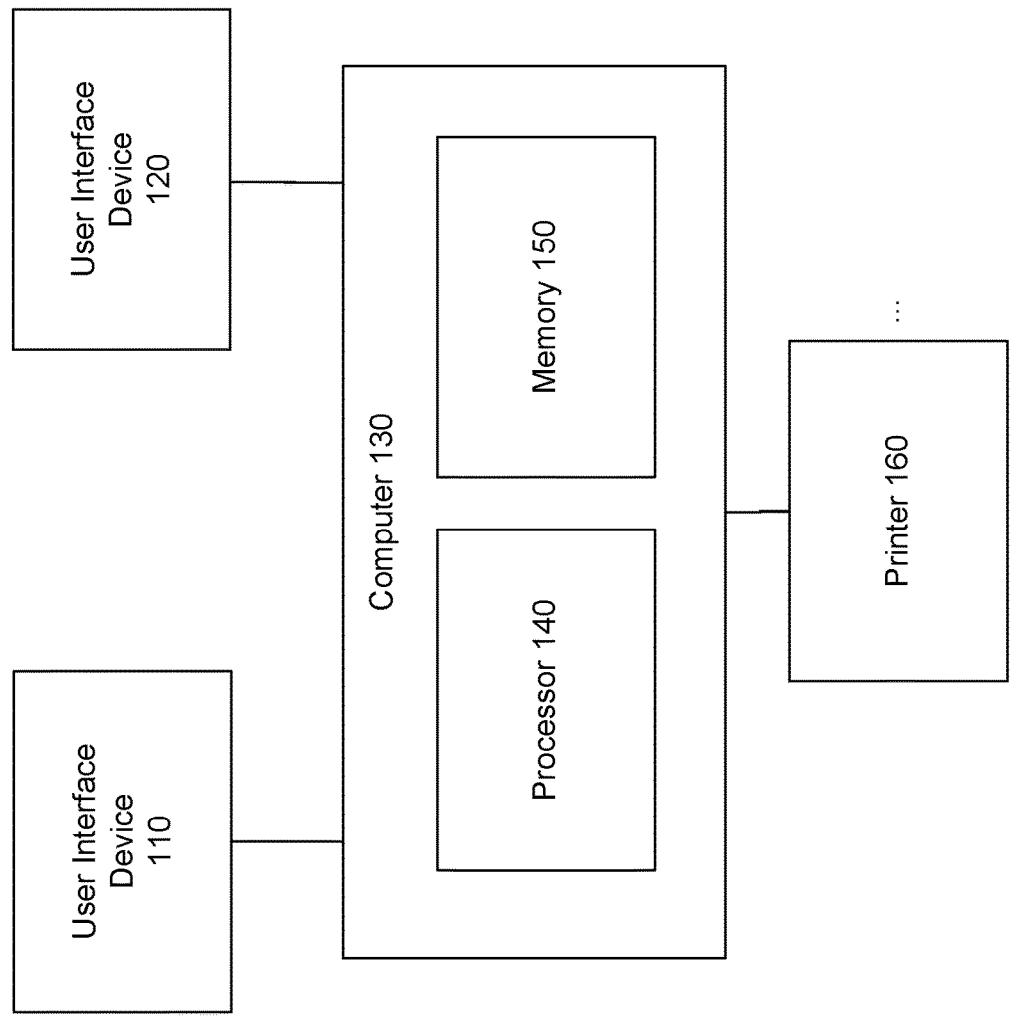
FIG. 1 is a schematic block diagram illustrating an embodiment of a computerized system for dynamically controlling inputs and modifying user interface elements associated with a multi-display point-of-sale (POS) device, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for managing printing tasks associated with a multi-display device, such as a POS device, by establishing and maintaining a printing task queue storing printing tasks for each of the at least one printer, receiving a first printing task from the first software interface associated with a first timestamp, determining a first target printer for the first printing task, the first target printer is one of the at least one printer, disabling write access to the printing task queue of the first target printer from the second software interface presented on the second display, adding the first printing task and its associated target printer to the printing task queue of the first printer, re-enabling the write access to the printing task queue of the first printer from the second software interface presented on the second display, and printing a current printing task from the first printer, the current printing task is a printing task in the printing task queue of the first printer with an earliest timestamp. The method may further include receiving a second printing task from the second software interface associated with a second timestamp, determining a second target printer for the second printing task, the second target printer is one of the at least one printer, disabling writing access to the printing task queue of the second target printer from the first software interface presented on the first display, adding the second printing task and its associated target printer to the printing task queue of the second printer, re-enable the writing access to the printing task queue of the second printer from the first software interface presented on the first display, and printing a current printing task from the second printer, the current printing task is a printing task in the printing task queue of the second printer with an earliest timestamp. The disclosed embodiments provide innovative technical features that allow for implementation of a multi-display device using a single computer, wherein the multi-display device is configured to provide printing service of at least one printer to requests from at least two displays, and wherein the at least two displays are being used at the same time. For example, disclosed embodiments enable efficient usage of computational resources, enables simultaneous usage of multiple displays connected to a single computer.

FIG. 1 is a schematic block diagram illustrating components of an exemplary system 100, consistent with disclosed embodiments. In some embodiments, and as discussed throughout this disclosure, system 100 is a POS (point-of-sale) device, but one of ordinary skill will understand that system 100 has applications outside of a POS environment. As shown in FIG. 1, embodiments of a system 100 may include user interface devices 110 and 120, and computer 130 comprising one or more processors 140, one or more memory devices 150, and at least one printer 160.

User interface devices 110 and 120 may be any input/output (I/O) devices (e.g., touch screen, monitor, touch panel, tablet) configured to receive user inputs. For example, user interface devices 110 and 120 may comprise pressure-sensitive devices. In some embodiments, user interface devices 110 and 120 may be configured to display various user interfaces to one or more users. Additionally, user interface devices 110 and 120 may be configured to receive one or more inputs from one or more users, such as touch inputs and/or inputs received from input/output devices, and may generate one or more outputs in response to the received one or more inputs. In some embodiments, user interface devices 110 and 120 may be configured to display different information, such as one or more different applications. Additionally or alternatively, user interface devices 110 and 120 may be configured to display the same information. In some embodiments, at least one of user interface devices 110 or 120 may include or be connected to various input/output devices, such as a keyboard, pointing device (e.g., a mouse), a camera, a microphone, a gesture sensor, an action sensor, a physical button, etc. In some embodiments, only one of user interface devices 110 and 120 may be connected to a keyboard and/or pointing device. Additionally or alternatively, at least one of user interface devices 110 or 120 may be configured to collect and process video and audio signals. In some embodiments, user interface devices 110 and 120 may include one or more communication modules (not shown) for sending and receiving information from external devices by, for example, establishing wired or wireless connectivity between user interface devices 110 and 120 and a network (not pictured). In some embodiments, system 100 may include more than two user interface devices. In some embodiments, user interface devices 110 and 120 may be comprised within a single user interface device.

Computer 130 may be any computing device (e.g., desktop computer, laptop, server) configured to house one or more processors 140 and one or more memory devices 150, as well as at least one printer and other hardware components. Computer 130 may be configured for wired and/or wireless communications and may include software that when executed by one or more processors 140 performs internet-related communication (e.g., TCP/IP) and content display processes. In some embodiments, computer 130 may include or be connected to various input/output devices, such as a keyboard, pointing device, a camera, a microphone, a gesture sensor, an action sensor, a physical button, etc. In some embodiments, computer 130 may be configured such that inputs received from an input/output device may be displayed on one user interface device but not the other, such as by modifying configuration settings for computer 130. Processor 140 may be any processing unit (e.g., computing device, microcontroller, microprocessor, system-on-chip, digital signal processor) configured to perform operations based on instructions stored in one or more memory devices, such as memory 150. For example, processor 140 may execute applications to communicate with components over a network (not pictured) and display content via user interface devices 110 and 120. Memory 150 may be volatile or non-volatile, magnetic, semiconductor, tape, optical, removable, non-removable, or other type of storage device or tangible computer readable medium, and may store one or more operating systems, such as Microsoft Windows, Unix, Linux, Android, Mac OS, iOS, or other types of operating systems.

In some embodiments, at least one printer 160 may each be communicatively connected to computer 130 and may each have a printing task queue. Processor 140 may establish and maintain each of the printing task queue. In some embodiments, processor 140 may establish and maintain a master printing task queue for all of the at least one printer 160. In some embodiments, processor 140 may establish and maintain both a master printing task queue and a printing task queue for each of the at least one printer 160. In some embodiments, a printing task queue (e.g., printing task queue for one of the at least one printer 160, master printing task queue) may include information of printing tasks, for example, contents to be printed, type of printing job, destination printer, and/or any information that a printer would need to perform the printing task.

In some embodiments, system 100 may be connected to a network (not pictured) configured to provide communications between components internal to system 100 as well as communications with devices external to system 100. For example, the network may be any type of network (including infrastructure) that provides communications, exchanges information, and/or facilitates the exchange of information, such as the Internet, or other suitable connection(s) that enables the sending and receiving of information between devices. In other embodiments, the network may include multiple networks, organizing for example a network of networks. In some embodiments, user interface devices 110 and 120 may be connected but not connected to each other via a network.

Figure 2:
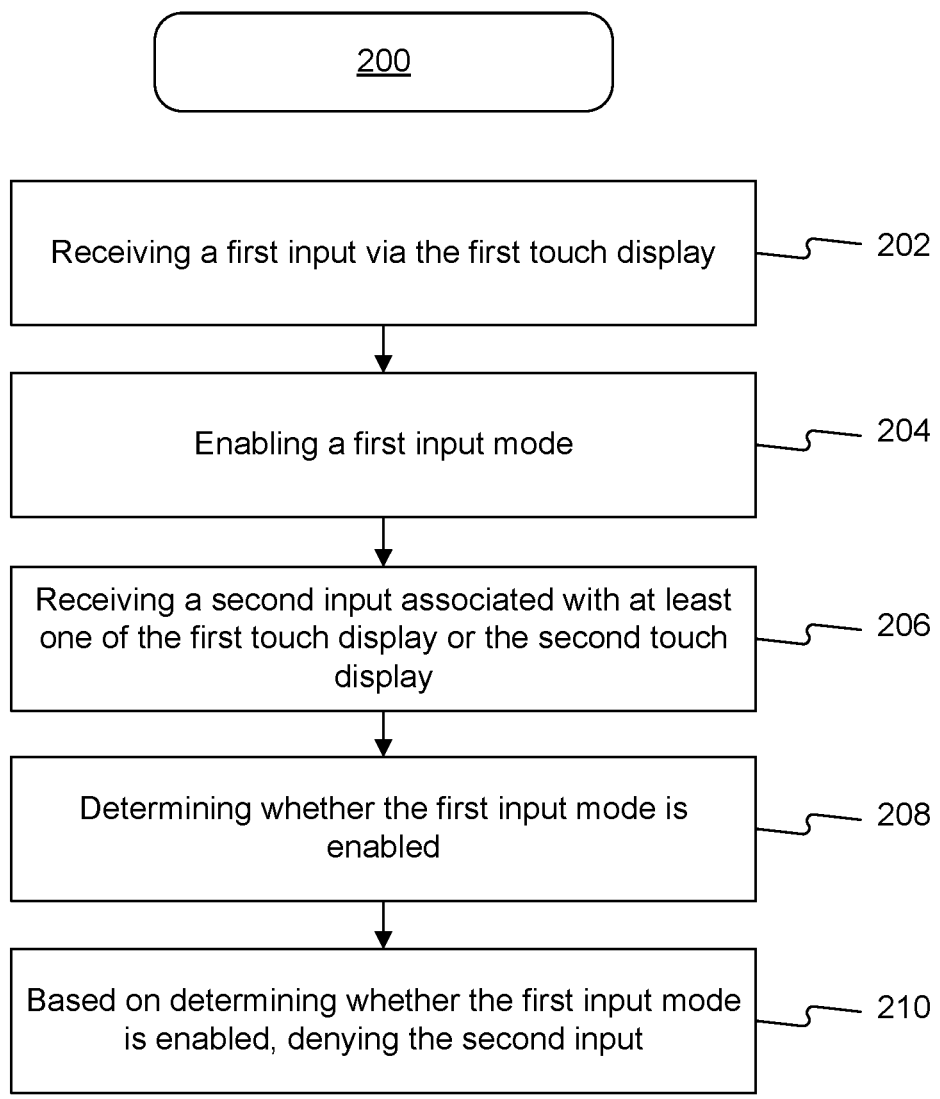
FIG. 2 shows an exemplary method for dynamically controlling inputs and modifying user interface elements associated with a multi-display point-of-sale (POS) device, consistent with the disclosed embodiments.

FIG. 2 shows an exemplary method 200 for dynamically controlling inputs and modifying user interface elements associated with system 100 which may be implemented as a multi-display device, such as a point-of-sale (POS) device, consistent with disclosed embodiments. In some embodiments, method 200 or a portion thereof may be performed by one or more processors 140 or one of systems 100, 300*a* (described in of FIG. 3A description below), or 300*b* (described in FIG. 3B description below). For example, systems may include a first touch display configured to receive one or more touch inputs, a second touch display configure to receive one or more touch inputs, one or more processors communicatively coupled to the first touch display and the second touch display, and one or more memory devices storing instructions that, when executed by the one or more processors, cause the system to perform the steps shown in FIG. 2. In some embodiments, the first touch display may comprise a customer-side touch display and the second touch display may comprise a merchant-side touch display. Additionally or alternatively, the first touch display and the second touch display may be physically connected to each other (either directly or through another device such as computer 130).

At step 202, one or more processors may be configured to receive a first input via the first touch display. In some embodiments, the first input may comprise a touch input. For example, system 100 may receive a first touch input signal via a first user interface presented on the first touch display. In some embodiments, the first user interface may include various elements selectable via touch and/or via I/O devices (e.g., pointing device, keyboard). For example, system 100 (e.g., at a coffee shop) may present on the first touch display one or more items, such as one or more categories (e.g., hot coffees, iced coffees, teas, seasonal, food, etc.) and/or one or more items within each category (e.g., for hot coffees, americano, cappuccino, espresso, etc.) in the form of selectable user interface elements. Additionally or alternatively, system 100 may present one or more payment options in the form of selectable user interface elements. In some embodiments, the first input may comprise a touch input selecting a user interface element. In some embodiments, the first input may comprise an input selecting a user interface element using an I/O device, such as a pointing device or keyboard. In some embodiments, the first input may comprise a touch input to awaken the display, such as if the display has gone to sleep. In some embodiments, the first input may comprise a touch input received on any pressure-sensitive surface of the first touch display, wherein the first touch display may be configured to transmit the input received on any pressure-sensitive surface of the first touch display to the one or more processors for further processing.

In some embodiments, a user may use the first user interface to instruct printing or indicate a printing task is needed. For example, the user may use the first user interface to instruct system 100 to print a receipt. In some embodiments, the user may user the first user interface to perform a task that may indicate a need for printing. For example, a user may use the first user interface to place an order, which may trigger system 100 to instruct one of the at least one printer to print an order confirmation.

In some embodiments, prior to receiving the first input, the one or more processors may be configured to detect a user. For example, the one or more processors may be configured to receive one or more detection signals from one or more sensors (e.g., camera, gesture sensor, action sensor) communicatively coupled and/or physically connected to system 100. In some embodiments, at least one of the one or more sensors may be configured to continuously collect sensor data.

At step 204, the one or more processors may be configured to enable a first input mode. For example, in some embodiments, the one or more processors may enable the first input mode by modifying a bit or other element in memory (e.g., in a data structure) in order to signify that the first input mode is enabled. In other embodiments, the one or more processors may enable the first input mode by modifying the registry of system 100's operating system. For example, the system 100's operating system may be Microsoft Windows, and the one or more processors may automatically modify the Windows registry to enable the first input mode in response to certain events, such as events described below.

In some embodiments, enabling the first input mode may comprise disabling certain inputs or may cause the one or more processors to disable certain inputs. For example, enabling the first input mode may comprise dynamically changing one or more settings to disable inputs received from one or more physical and/or virtual keyboards. In some embodiments, enabling the first input mode may comprise dynamically disabling connection to one or more physical keyboards. A keyboard as discussed in the disclosed embodiments may comprise a physical or virtual mechanism to input letters, numbers and/or characters into a continuous input field, such as into a text input field. For example, a virtual keyboard may be a software keyboard presented on a display and configured for touch inputs. In some embodiments, enabling the first input mode may comprise dynamically changing one or more settings to disable one or more inputs received from one or more pointing devices. For example, one or more inputs received from the one or more pointing devices may comprise movement signals and/or hover signals. In some embodiments, enabling the first input mode may allow scroll signals and/or click signals to be received from the one or more pointing devices. In some embodiments, enabling the first input mode may comprise dynamically disabling connection to the one or more pointing devices. In some embodiments, enabling the first input mode may include using at least one of JavaScript or custom scripts to enable and/or disable certain user interface elements and inputs.

In some embodiments, the one or more processors may be configured to enable the first input mode in response to receiving the first input. In some embodiments, the one or more processors may be configured to enable the first input mode in response to detecting the user. For example, the at least one processor may be configured to enable the first input mode in response to receiving the one or more detection signal from the one or more sensors. In some embodiments, the one or more processors may be configured to enable the first input mode in response to receiving an on/off signal from a virtual or physical button. For example, the virtual button may be a user-interface button presented on the first touch display and/or the second touch display. The physical button may be a physical button communicatively coupled and/or physically connected to system 100.

In some embodiments, the first input mode may include detecting one or more first input elements displayed on at least one of the first touch display or the second touch display. For example, detecting one or more first input elements may include inspecting all input elements displayed on at least one of the first touch display or the second touch display and checking one or more properties of each input element to determine whether the input element is a first input element. In some embodiments, the one or more first input elements may comprise continuous input elements. Continuous input elements as discussed in the disclosed embodiments may include inputs and/or input fields that require continuous focus, such as those illustrated and discussed in FIG. 4A below. For example, inputs from a physical and/or virtual keyboard may require continuous focus on a particular text input field because changing the focus from the particular text input field to another user interface element will not feed succeeding inputs received from the physical and/or virtual keyboard into the particular text input field until focus is returned to the particular text input field. Additionally or alternatively, inputs such as hover signals and/or movement signals received from a pointing device may require continuous focus.

In some embodiments, the one or more first input elements may comprise text input fields configured to receive input from only a physical keyboard or a virtual keyboard. Additionally or alternatively, the one or more first input elements may comprise a virtual keyboard.

In some embodiments, the first input mode may further comprise generating one or more second input elements. For example, the one or more second input elements may comprise discrete input elements. Discrete input elements as discussed in the disclosed embodiments may include all inputs and/or input fields that do not require continuous focus. For example, discrete inputs may comprise selectable user interface buttons, such as those illustrated and discussed in FIGS. 4B and 4C below.

In some embodiments, the one or more second input elements may consist of one or more non-keyboard inputs and one or more input fields configured to present and accept the one or more non-keyboard inputs. For example, non-keyboard inputs may comprise user interface buttons, such as those illustrated and discussed in FIGS. 4B and 4C below. In some embodiments, the one or more second input elements may not comprise one or more text input fields configured to receive input from only a physical keyboard or a virtual keyboard.

In some embodiments, the first input mode may further comprise replacing the one or more first input elements with the generated one or more second input elements for display on at least one of the first touch display or the second touch display. For example, the first input mode may be a POS mode wherein when POS mode is enabled, the one or more processors may be configured to cause the first touch display and the second touch display to replace continuous input elements with discrete input elements. In some embodiments, the one or more processors may replace continuous input fields (e.g., text input fields) presented on the first touch display and/or second touch display with discrete input fields (e.g., input field configured to display a value of the selected discrete input(s)).

At step 206, the one or more processors may be configured to receive a second input associated with at least one of the first touch display or the second touch display. For example, system 100 may receive a second input via a second user interface presented on the second touch display. In some embodiments, the second user interface may include various elements selectable via touch and/or via I/O devices (e.g., pointing device, keyboard). For example, system 100 may present on the second touch display one or more user interfaces to place orders, accept orders, edit orders, add notes, view ordered items for both in-store and online orders, apply discount amounts, etc. In some embodiments, the second input may comprise an input received from a physical keyboard communicatively coupled to system 100. In some embodiments, the second input may comprise a touch input received from a virtual keyboard. In some embodiments, the second input may comprise a touch input signal received in response to a user selecting a button included in the second user interface, wherein the button is a discrete input.

At step 208, the one or more processors may be configured to determine whether the first input mode is enabled. For example, in some embodiments, the one or more processors may check to determine whether a particular bit in a data structure indicating that the first input mode is enabled is set. As another example, in some embodiments, the one or more processors may check the operating system registry to determine whether the first input mode is enabled. In some embodiments, determining whether the first input mode is enabled may comprise using software, hardware, firmware, or a combination there of to determine the status of a first input mode.

At step 210, the one or more processors may be configured to, based on determining whether the first input mode is enabled, deny the second input. For example, based on determining that the first input mode is enabled, the one or more processors may ignore a second input, wherein the second input is an input received from the physical keyboard. Additionally or alternatively, based on determining that the first input mode is enabled, the one or more processors may ignore the second input, wherein the second input is an input received based on a touch signal generated in response to making a selection on a virtual keyboard.

In some embodiments, the one or more processors may be configured to, based on determining that the first input mode is enabled, accept the second input, wherein the second input is a discrete input. For example, based on determining that the first input mode is enabled, the one or more processors may be configured to accept a touch input selecting a button included in the second user interface, wherein the button is a discrete non-keyboard input.

In some embodiments, the one or more processors may be configured to, based on determining that the first input mode is not enabled, accept both continuous and discrete inputs via both the first touch display and the second touch display. In some embodiments, the one or more processors may be configured to, based on determining that the first input mode is not enabled, accept both continuous and discrete inputs via only one of the first touch display or the second touch display.

In some embodiments, the one or more processors may be configured to detect a trigger event. For example, detecting the trigger event may comprise determining that a predetermined time has passed since input was last received via the first user interface of the first touch display. In some embodiments, system 100 may further comprise one or more sensors, and detecting the trigger event may comprise detecting that no users are in front of the first touch display based on information received from the one or more sensors. For example, the one or more sensors may comprise one or more cameras configured to collect video stream data. In some embodiments, the one or more processors may be configured to use a pre-trained neural network (e.g., recurrent neural network, long short-term memory, artificial neural network, convolutional neural network) to detect one or more users using information received from the one or more sensors, and the one or more processors may be further configured to use the pre-trained neural network to detect that no users are in front of the first touch display.

In some embodiments, the one or more processors may be configured to, in response to detecting the trigger event, enable a second input mode. For example, enabling the second input mode may comprise disabling the first input mode. The one or more processors may be configured to enable the second input mode and disable the first input mode using similar techniques as discussed above with respect to enabling the first input mode.

In some embodiments, enabling the second input mode may comprise causing both the first touch display and the second touch display to accept one or more inputs via first input elements. Alternatively, enabling the second input mode may comprise causing only one of the first touch display and the second touch display to accept user input via first input elements. For example, enabling the second input mode may cause the second touch display to accept user input via first input elements. In some embodiments, in the second input mode, first input elements may have higher display priority than second input elements. For example, when the second input mode is enabled, the one or more processors may be configured to display first input elements (e.g., user interface illustrated in FIG. 4A) over second input elements (e.g., user interface illustrated in FIG. 4B) in situations where either could be displayed. In some embodiments, the second input mode may be enabled whenever the first input mode is disabled, and vice versa.

Figure 3A:
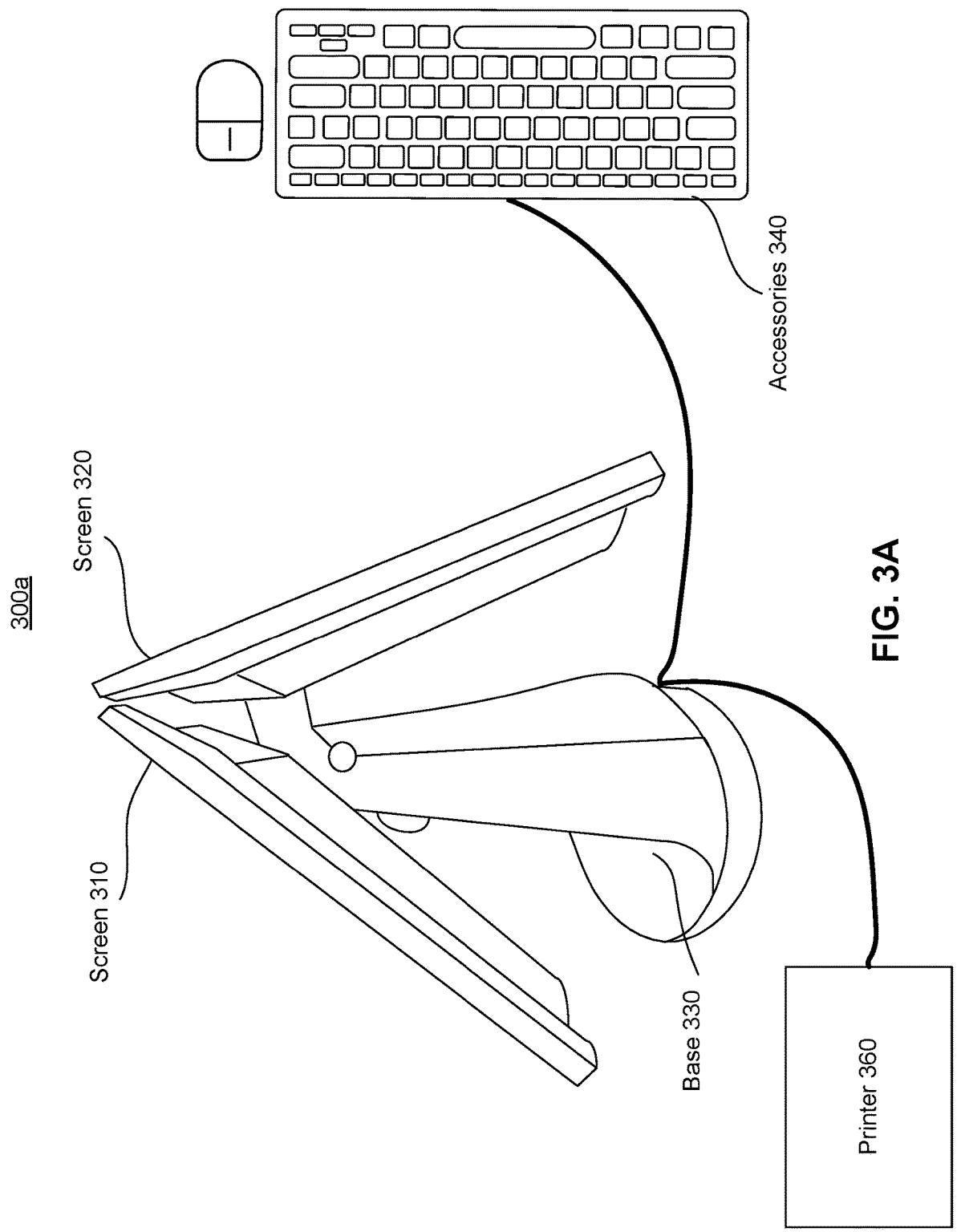
FIGS. 3A and 3B illustrate exemplary embodiments of a point-of-sale (POS) system, consistent with the disclosed embodiments.
Figure 3B:
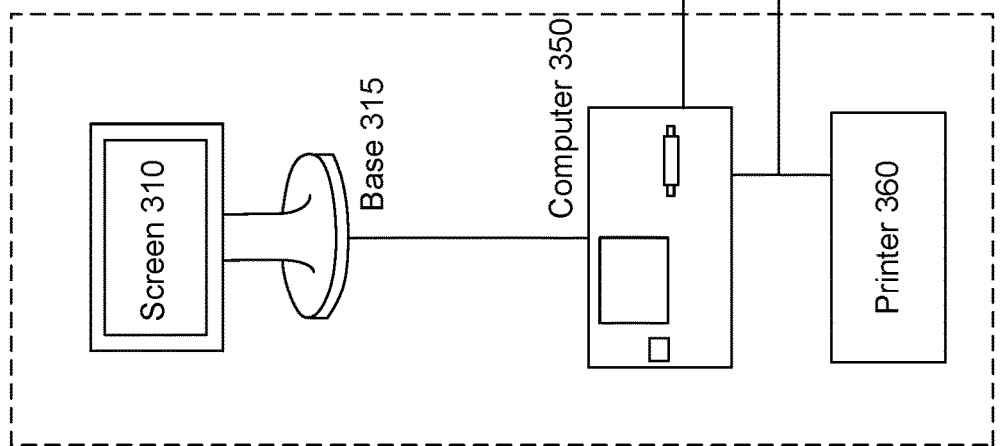

FIGS. 3A and 3B illustrate exemplary systems 300a and 300b, consistent with disclosed embodiments. In some embodiments, and as discussed throughout this disclosure, systems 300a and 300b are POS (point-of-sale) devices, but one of ordinary skill will understand that systems 300a and 300b have applications outside of a POS environment. System 300a may include display 310, display 320, base 330, one or more accessories 340, a computer (not pictured), at least one printer 360 (i.e., 160 in FIG. 1) or other components consistent with disclosed embodiments. System 300b may include display 310, base 315, display 320, base 325, computer 350, at least one printer 360 (i.e., 160 in FIG. 1) or other components consistent with disclosed embodiments. Display 310 and display 320 may be touch screens configured to receive touch input and/or input from one or more accessories 340. Bases 315, 325 and 330 may be supportive structures designed to hold up displays 310 and 320. In some embodiments, Systems 300a and 300b may be configured for wired communication (e.g., high speed internet cables, fiber optic cables, USB cable, or other cables) and wireless communication (e.g., cellular, LTE, LoRA (long range wireless) module, a GSM transceiver, a 3G transceiver, a 4G transceiver, a Wi-Fi router, or other equipment for wireless communication). In some embodiments, systems 300a and 300b include one or more cameras (not pictured). In some embodiments, a display and computer may be comprised within a single device (e.g., tablet) configured to allow connection with other displays. In some embodiments, components of system 300a and 300b may be connected via a serial connection (e.g., an RS-232 connection). For example, each of the at least one printer 360 may be connected to system 300a or 300b via serial ports. In some embodiments, a serial port connection between printer 360 and a system (e.g., 300a) imposes a requirement that printer 360 receive and process only a single printing job at a time.

Components of a system may be distributed at various locations within a physical location as shown in system 300b of FIG. 3B. For example, display 310, base 315 and computer 350 may be in location A of a retail store and display 320 and base 325 may be in location B of the retail store and connected to the components in location A using a long cable. The configuration shown in FIG. 3B may be capable of separating a merchant-side of a store (e.g., Location A) from a customer-side of the store (e.g., Location B) while reducing computational resources. In some embodiments, the at least one printer 360 may be placed with one or more component of the system 300a or 300b, or placed in a separate location. For example, a printer may be placed with the display 310 or computer 350 at location A, or with the display 320 at location B, or at a location other than locations A and B.

Both configurations shown in FIGS. 3A and 3B may enable a single computer (e.g., computer 350) to efficiently and effectively generate user interfaces that allow for processing inputs received from separate touch screens in serial communication being used by different users at the same time.

Figure 4A:
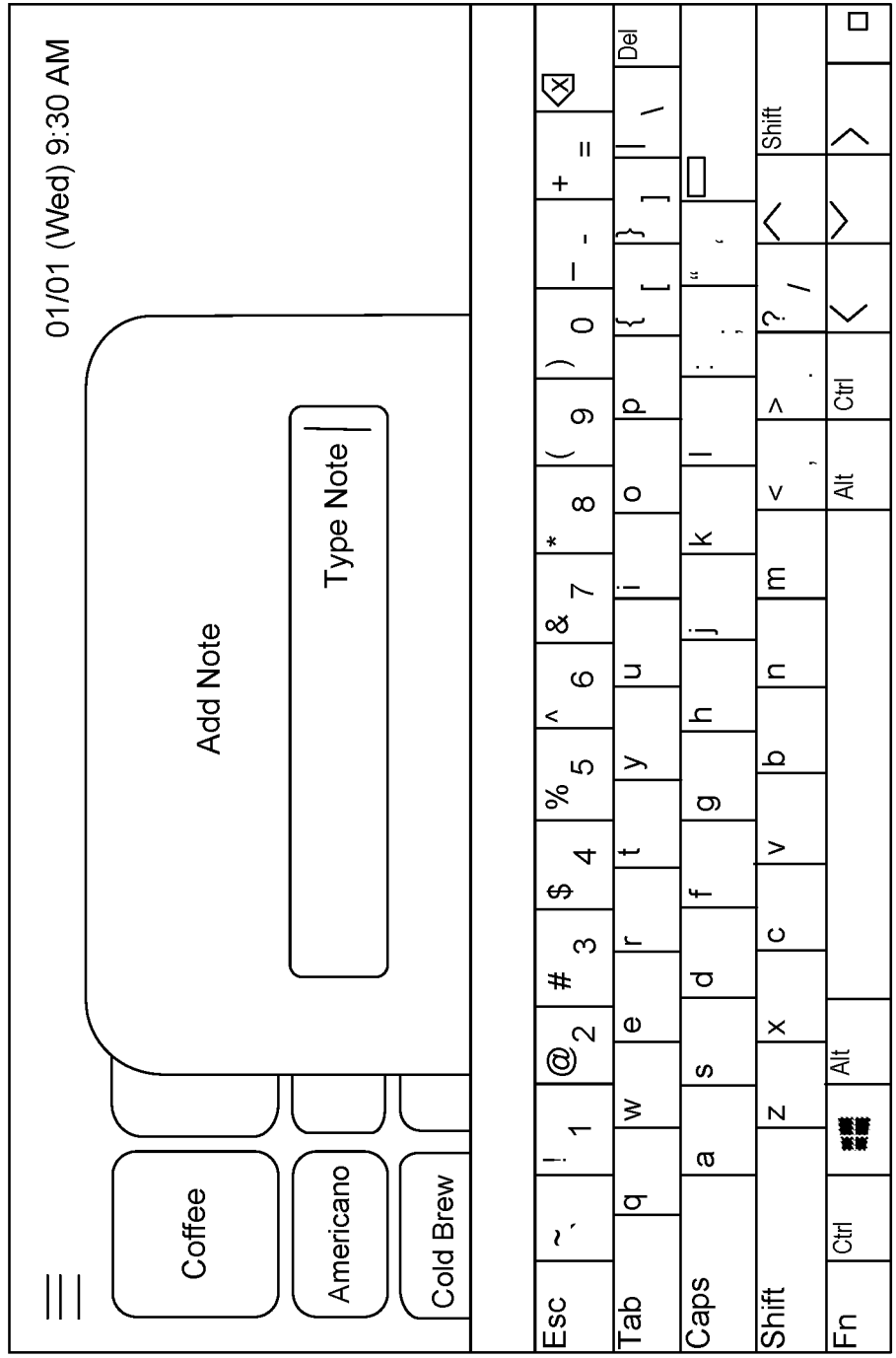
FIG. 4A depicts an exemplary user interface displayed in a non-POS mode, consistent with the disclosed embodiments.
Figure 4B:
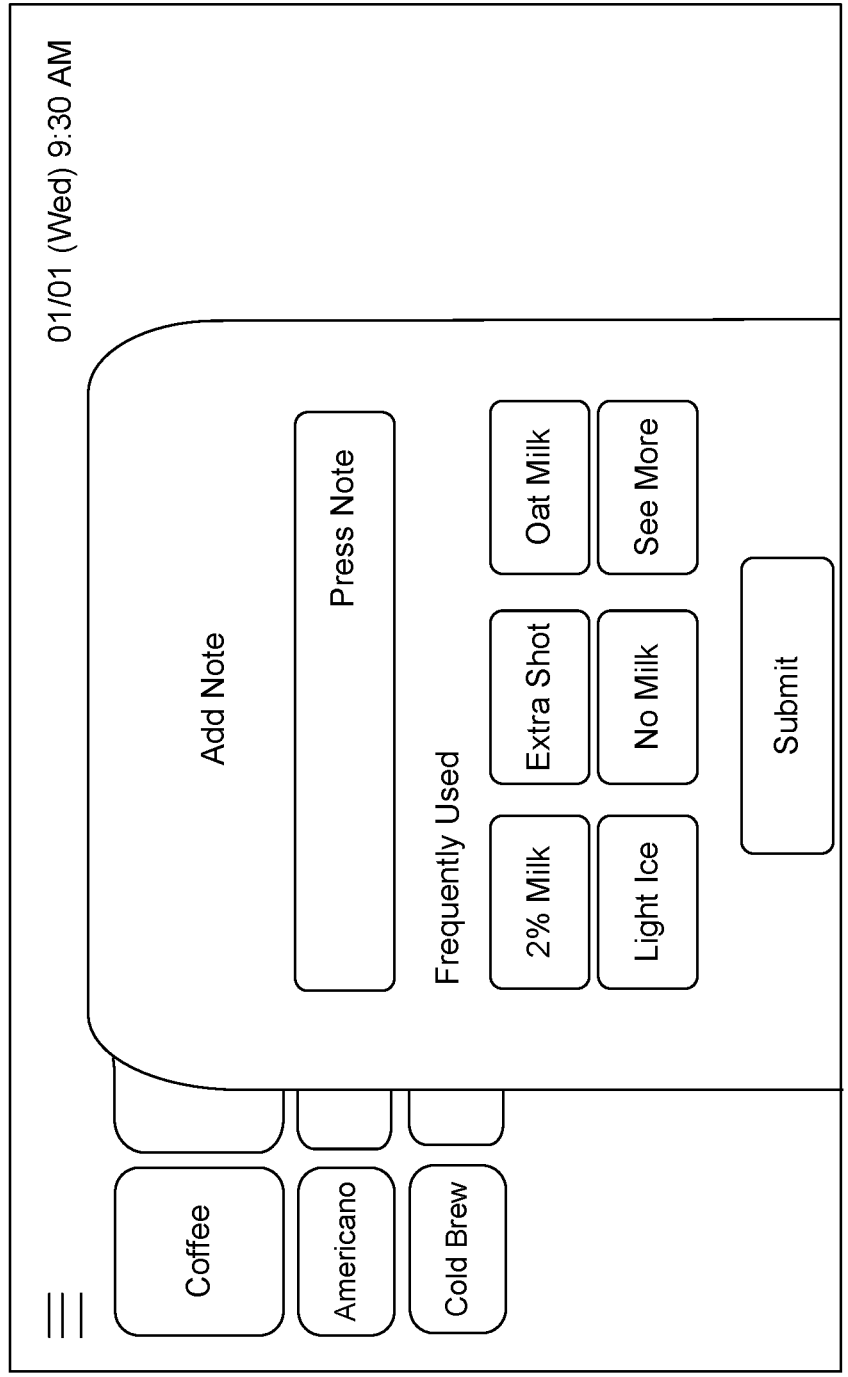

FIG. 4A-4C depict exemplary user interfaces that may be displayed on one or more touch screens of a system (e.g., systems 100, 300a, or 300b). For example, as shown in FIG. 4A, interface 400a may be an exemplary interface displayed on one or more touch screens (e.g., user interface device 110, user interface device 120, display 310, display 320) before a first input mode is enabled and/or after the first input mode is disabled (i.e., when a second input mode is enabled), as discussed above with respect to step 210 of FIG. 2. Interface 400a may comprise one or more continuous input elements as well as one or more discrete input elements, and may allow inputs to be received via a virtual keyboard, as illustrated, as well as a physical keyboard connected to the POS system. The received inputs may be fed into and displayed in a text input field (e.g., text box with "Type Note"). For example, interface 400a may be presented on a merchant-side touch screen.

As shown in FIG. 4B, once the first input mode is enabled (as discussed above with respect to, e.g., FIG. 4), the system may generate interface 400b and may replace interface 400a with interface 400b. For example, the system may identify and create a list of continuous input elements included in interface 400a. The system may further generate one or more discrete input elements and may replace the one or more continuous input elements of interface 400a such that interface 400b may comprise only discrete input elements. Interface 400b may allow discrete inputs such as touch, scroll, and drag inputs to be received via the touch screen and a pointing device connected to the system.

FIG. 4C illustrates another interface 400c that may be presented on a touch screen when the first input mode is enabled. For example, interface 400c may comprise discrete inputs in the form of selectable user interface buttons (e.g., 1, 2, 3, . . . 00, ←, "submit"). Interface 400c may further comprise one or more discrete input fields (e.g., box with "Enter value") configured to display one or more currently selected values. For example, if a touch input associated with the user interface button of "1" is first received, box with "Enter value" may be dynamically updated to display "1." If, subsequently, a touch input associated with the user interface button of "2" is received, box with "1" may be dynamically updated to display "12." If, subsequently, a touch input associated with the user interface button of "←" is received, box with "12" may be dynamically updated to display "1." While such input fields would normally be operated in a continuous manner (i.e., requiring focus on the field and accepting input via a software or hardware keyboard) and using, for example, operating system APIs and routines to receive input from such devices in a continuous manner, the input field in exemplary interface 400c would be implemented such that it would render inputs received through the selectable user interface buttons and render an input based on those inputs. For example, one or more processors may implement a stack data structure that accepts touch inputs of digits 0-9 as a "push" and touch inputs of the backspace ("←") key as a "pop" from the stack.

Some disclosed embodiments involve a computer-implemented system and method for providing printing service by a multi-display device, the system comprising one or more memory devices storing instructions, a first display configured to generate a first printing task via a first software interface, a second display configured to generate a second printing task via a second software interface, at least one printer, and one or more processors, communicatively coupled to the first display, the second display, and the at least printer, configured to execute the instructions to perform operations consistent with the disclosed methods. In some embodiments, the first display, the second display, and/or the at least one printer may be connected to the system via serial ports.

In some embodiments, the first software interface and the second software interface are identical interfaces presented on different displays. Identical interfaces, in some embodiments, refers to interfaces with the same interface designs and functionalities being presented on different displays and may be capable of showing the same elements, but may at a specific time show different elements. For example, the first display and the second display each present a same software interface, making the first and second display functionally identical to the user. However, although both the first and second displays are capable of showing all of interfaces 400a-400c, at a specific time, the first display may display interface 400a, and the second display may display interface 400b. From the user's perspective, submitting printing tasks on the first display and on the second display may have a same experience. In some embodiments, an identifier may present on the software interface and/or the display. In such cases, the first and second software interfaces may be identical except the identifier. For example, user A may use display #1 (with software interface #1 running on it) to request a print out of order #1, while user B may use display #2 (with software interface #2 running on it) to request a print out of receipt of order #2; the interfaces #1 and #2 are identical in the way that they have the same functionality, but may show different elements at a specific time. The interfaces #1 and #2 may have their own identifiers (i.e., #1 and #2, respectively) shown on a corner of the display.

In some embodiments, different displays may present different software interfaces. For example, one display may have a software interface designed for the merchant to view and manage orders, and the other displays may have a different software interface designed for customers to view and pay for only their order.

Figure 5:
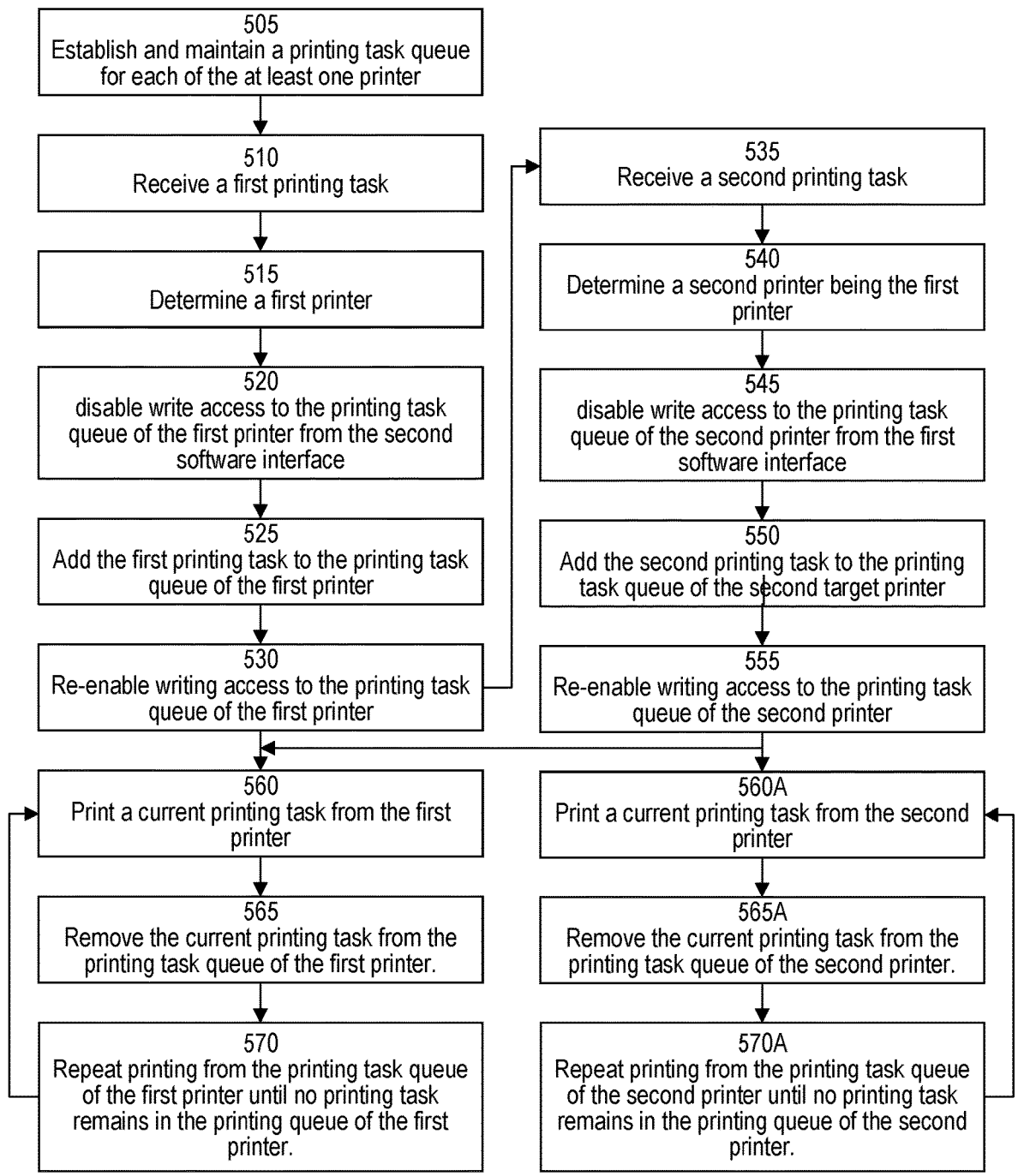
FIG. 5 is an illustration of a method for managing printing tasks associated with a multi-display device such as a point-of-sale (POS) device, consistent with some embodiments of this disclosure.

FIG. 5 is an illustration of a method for providing printing service by a multi-display device, consistent with some embodiments of this disclosure.

In some embodiments, in step 505, processor 140 may establish and maintain a printing task queue storing printing tasks for each of the at least one printer. In some embodiments, a printing task queue (e.g., printing task queue for one of the at least one printer 160, master printing task queue) may include information of printing tasks, for example, contents to be printed, type of printing job, destination printer, and/or any information that a printer would need to perform the printing task. In some embodiments, the at least one printer may be in serial communication with the processor 140. Allowing processor 140 to maintain the printing task queue may relieve the load from a serial port, enabling the system to start data transmission only when a printing task is ready for printing (rather than monopolizing a connection between a system and the at least one printer).

In some embodiments, in step 510, processor 140 may receive a first printing task from the first software interface associated with a first timestamp. In some embodiments, a user may submit, instruct, or indicate a printing task from the first software interface presented on the first display. In some embodiments, a user may use the first user interface to instruct printing or indicate a printing task is needed. For example, the user may use the first user interface to instruct system 100 to print a receipt. In some embodiments, the user may user the first user interface to perform a task that may indicate a need for printing. For example, a user may use the first user interface to place an order, which may trigger system 100 to instruct one of the at least one printer to print an order confirmation. The timestamp may be the time such printing task was assigned, indicated, or transmitted. In some embodiments, the first software interface may be configured to present one or more input fields, the one or more input fields being configured to accept non-keyboard inputs. In some embodiments, the first display may be a touch display as discussed in previous sections. For example, the first display may be configured to receive one or more touch inputs. In some embodiments, the first display may comprise a customer-side touch display. For example, system 100 may receive a first touch input signal from the first software interface presented on the first display. In some embodiments, the first software interface may be a graphical interface that enables communication with a piece of software running on computer 130. In some embodiments, the first software interface may include various elements selectable via touch and/or via I/O devices (e.g., pointing device, keyboard).

In some embodiments, in step 515, processor 140 may determine a first target printer for the first printing task, the first target printer is one of the at least one printer. In some embodiments, processor 140 may determine the first target printer for the first printing task based on the details of the first printing task, for example, the type of document being printed, the intended recipients of the printed document. For example, a payment receipt would be routed to a printer near the customer or a waiter, or a printer near the device where credit card was swiped. For example, an food order would be routed to a printer near the cooking station, or more specifically, the sub-cooking station where an ordered food item would be made (e.g., sub-cooking stations of salad bar, burger grill, sushi workstation could be located in different areas and each has a printer).

In some embodiments, in step 520, processor 140 may disable write access to the printing task queue of the first target printer from the second software interface presented on the second display. In some embodiments, disabling write access to the printing task queue of the first printer may include denying a request to make changes to the printing task queue of the first printer and requesting a resend of the denied request after a predetermined time. For example, an input from the second software interface may be denied by not permitting the input be written into the printing task queue of the first printer. Subsequently, processor 140 may request the second software interface to resend the same input again after a predetermined time (e.g., milliseconds, seconds, minutes, or any interval the processor 140 may estimate that the writing access to the printing task queue be re-enabled, as discussed below at least with respect to step 530).

In some embodiments, the one or more processors 140 may be configured to ignore a printing task sent from the second user interface, and request that the second user interface to resend the ignored printing task again after a period of time (e.g., after some time, on the order of milliseconds or seconds). In some embodiments, the second user interface may withhold the ignored printing request for the period of time and send it again without requesting additional user interactions with the system 100. This enables a more convenient system from a user's perspective because it appears to have processed the user's printing request without needing to retry (despite multiple software using the device at the same time). This also allows efficient serial communication between the printer and the displays.

In some embodiments, in step 525, processor 140 may add the first printing task and its associated target printer to the printing task queue of the first printer. For the first printing task, the associated target printer is the first printer, as determined in step 515. In some embodiments, a printing task may include contents to be printed, type of printing job, destination printer, data and time of submission, and/or any information that a printer would need to perform the printing task.

In some embodiments, after the first printing task is added to the printing task queue of the first printer, in step 530, processor 140 may re-enable the write access to the printing task queue of the first printer from the second software interface presented on the second display.

In some embodiments, in step 535, processor 140 may receive a second printing task from the second display via the second software interface associated with a second timestamp. In some embodiments, a user may submit, instruct, or indicate a printing task from the second software interface presented on the second display. In some embodiments, a user may use the second user interface to instruct printing or indicate a printing task is needed. For example, a user may use the second user interface to instruct system 100 to print a receipt. In some embodiments, the user may use the second user interface to perform a task that indicates a need for printing. For example, a user may use the second user interface to place an order, which may trigger system 100 to instruct one of the at least one printer to print an order confirmation. The timestamp may be the time such printing task was assigned, indicated, or transmitted. In some embodiments, the second software interface may be configured to present one or more input fields, the one or more input fields being configured to accept non-keyboard inputs. In some embodiments, the second display may be a touch display as discussed in previous sections. For example, the second display may be configured to receive one or more touch inputs. In some embodiments, the second display may comprise a customer-side touch display. For example, system 100 may receive a second touch input signal from the second software interface presented on the second display. In some embodiments, the second software interface may be a graphical interface that enables communication with a piece of software running on computer 130. In some embodiments, the second software interface may include various elements selectable via touch and/or via I/O devices (e.g., pointing device, keyboard).

In some embodiments, in step 540, processor 140 may determine a second target printer for the second printing task. In some embodiments, similar to determining the first target printer for the first printing task, processor 140 may determine the second target printer for the second printing task based on the details of the second printing task, for example, the type of document being printed, the intended recipients of the printed document. For example, a payment receipt would be routed to a printer near the customer or a waiter, or a printer near the device where credit card was swiped. For example, an food order would be routed to a printer near the cooking station, or more specifically, the sub-cooking station where an ordered food item would be made (e.g., sub-cooking stations of salad bar, burger grill, sushi workstation could be located in different areas and each has a printer).

In some embodiments, the second printer may be the same as the first printer. In some embodiments, the second printer may be determined to be a different printer than the first printer. In any event, in step 545, processor 140 may disable writing access to the printing task queue of the second target printer from the first software interface presented on the first display. In some embodiments, similar to the embodiments discussed above in the cases of the first printing task queue, disabling write access to the printing task queue of the second printer may include denying a request to make changes to the printing task queue of the first printer and requesting a resend of the denied request after a predetermined time. For example, an input from the first software interface may be denied by not permitting the input be written into the printing task queue of the second printer. Subsequently, processor 140 may request the first software interface to resend the same input again after a predetermined time (e.g., milliseconds, seconds, minutes, or any interval the processor 140 may estimate that the writing access to the printing task queue be re-enabled, as discussed below at least with respect to step 555).

In some embodiments, the one or more processors 140 may be configured to ignore a printing task sent from the first user interface, and request that the first user interface to resend the ignored printing task again after a period of time (e.g., after some time, on the order of milliseconds or seconds). In some embodiments, the first user interface may withhold the ignored printing request for the period of time and send it again without requesting additional user interactions with the system 100. This enables a more convenient system from a user's perspective because it appears to have processed the user's printing request without needing to retry (despite multiple software using the device at the same time). This also allows an efficient serial communication between the printer and the displays.

In some embodiments, in step 550, processor 140 may add the second printing task and its associated target printer to the printing task queue of the second printer. For the second printing task, the associated target printer is the second printer, as determined in step 540. In some embodiments as discussed in previous sections, processor 140 may determine that the second printer is the same as or different from the first printer. In some embodiments, a printing task may include contents to be printed, type of printing job, destination printer, data and time of submission, and/or any information that a printer would need to perform the printing task.

In some embodiments, after the second printing task is added to the printing task queue of the second printer, in step 555, processor 140 may re-enable the writing access to the printing task queue of the second printer from the first software interface presented on the first display.

In some embodiments, in step 560, processor 140 may print a current printing task from the first printer, the current printing task being a printing task in the printing task queue of the first printer with an earliest timestamp. In some embodiments, the timestamp may be the time at which a user submitted, instructed, or indicated the printing task from one of the software interface. In some embodiments, the timestamp may be the time at which the printing task was submitted by the first or second software interface. In some embodiments, the timestamp may be the time at which the printing task was added to the printing task queue. In some embodiments, there may be none or at least one printing task in the printing task queue. In cases where there is at least one printing task in the printing task queue, the current payment information may be the one having the earliest timestamp, and thus the next printing task to be printed on the corresponding printer.

In some embodiments, when only one user is requesting a printing task through one of the interfaces, processor 140 may skip steps 535, 540, 545, 550, 555, and execute step 560 after executing step 530.

In some embodiments, in step 565, processor 140 may remove the current printing task from the printing task queue of the first printer upon receiving the confirmation that the printing task was successfully printed or transmitted to the determined printer and was being printed. In some embodiments, removing the current printing task from the printing task queue may include deleting the current printing task from the printing task queue. In some embodiments, removing the current printing task from the printing task queue may include marking the current printing task as printed or complete. For example, the printing task queue may include an indicator for each printing task entry. Each indicator may indicate the status of the corresponding printing task. In some embodiments, the status of a printing task entry may indicate whether the printing task entry has been printed.

In some embodiments, in step 570, processor 140 may print another printing task in the printing task queue of the first printer with an earliest timestamp, until no printing task remains in the printing task queue of the first printer.

In some embodiments, when processor 140 determined that the second printer to be a different printer other than the first printer, steps 560, 565, and 570 may be performed similarly as steps 560A, 565A, and 570A by the second printer. In this way, steps 560A, 565A, and 570A ensure that the second printer may print all printing tasks in the printing task queue of the second printer until no printing task remains in the printing task queue of the second printer.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for providing printing service by a multi-display device, the system comprising:
one or more memory devices storing instructions;
a multi-display device having a first display and a second display, wherein:
the first display configured to generate a first printing task via a first software interface; and
the second display configured to generate a second printing task via a second software interface;
at least one printer connected to the multi-display device; and
one or more processors, communicatively coupled to the first display, the second display, and the at least one printer, configured to execute the instructions to perform operations comprising:
establishing and maintaining a printing task queue storing printing tasks for each of the at least one printer;
receiving a first printing task from the first software interface associated with a first timestamp;
determining a first target printer for the first printing task, the first target printer is one of the at least one printer;
disabling write access to the printing task queue of the first target printer from the second software interface presented on the second display;
adding the first printing task and its associated target printer to the printing task queue of the first target printer;
re-enabling the write access to the printing task queue of the first target printer from the second software interface presented on the second display;
printing a current printing task from the first target printer, the current printing task is a printing task in the printing task queue of the first target printer with an earliest timestamp;
receiving a second printing task from the second software interface associated with a second timestamp;
determining a second target printer for the second printing task, the second target printer is the same as the first target printer;
disabling writing access to the printing task queue of the second target printer from the first software interface presented on the first display;
adding the second printing task to the printing task queue of the second target printer; and
re-enable the writing access to the printing task queue of the second target printer from the first software interface presented on the first display.

2. The computer-implemented system of claim 1, wherein disabling write access to the printing task queue of the first target printer comprises:
denying a request to make changes to the printing task queue of the first target printer; and
requesting a resend of the denied request after a predetermined time.

3. The computer-implemented system of claim 1, the instructions further comprising:
removing the current printing task from the printing task queue of the first target printer.

4. The computer-implemented system of claim 3, the instructions further comprising:
printing another printing task in the printing task queue of the first target printer with an earliest timestamp, until no printing task remains in the printing task queue of the first target printer.

5. The computer-implemented system of claim 1, wherein disabling writing access to the printing task queue of the second target printer comprises:
 denying a request to make changes to the printing task queue of the second target printer; and
 requesting a resend of the denied request after a predetermined time.

6. The computer-implemented system of claim 1, the instructions further comprising:
 removing the current printing task from the printing task queue of the second target printer.

7. The computer-implemented system of claim 6, the instructions further comprising:
 printing another printing task in the printing task queue of the second target printer with an earliest timestamp, until no printing task remains in the printing task queue of the second target printer.

8. The computer-implemented system of claim 1, wherein the first and the second software interface each is configured to present one or more input fields, the one or more input fields being configured to accept non-keyboard inputs.

9. The computer-implemented system of claim 1, wherein the first software interface and the second software interface are identical interface presented on different displays.

10. The computer-implemented method of claim 1, wherein disabling writing access to the printing task queue of the second target printer comprises:
 denying a request to make changes to the printing task queue of the second target printer; and
 requesting a resend of the denied request after a predetermined time.

11. The computer-implemented method of claim 1, further comprising:
 removing the current printing task from the printing task queue of the second target printer.

12. The computer-implemented method of claim 11, further comprising:
 printing another printing task in the printing task queue of the second target printer with an earliest timestamp, until no printing task remains in the printing task queue of the second target printer.

13. A computer-implemented method for providing printing service by a multi-display device, the multi-display device includes a first display configured to generate a first printing task via a first software interface, a second display configured to generate a second printing task via a second software interface, and at least one printer connected to the multi-display device, the method comprises:
 establishing and maintaining a printing task queue storing printing tasks for each of the at least one printer;
 receiving a first printing task from the first software interface associated with a first timestamp;
 determining a first target printer for the first printing task, the first target printer is one of the at least one printer;
 disabling writing access to the printing task queue of the first target printer from the second software interface presented on the second display;
 adding the first printing task and its associated target printer to the printing task queue of the first target printer;
 re-enable the writing access to the printing task queue of the first target printer from the second software interface presented on the second display;
 printing a current printing task from the first target printer, the current printing task is a printing task in the printing task queue of the first target printer with an earliest timestamp;
 receiving a second printing task from the second software interface associated with a second timestamp;
 determining a second target printer for the second printing task, the second target printer is the same as the first target printer;
 disabling writing access to the printing task queue of the second target printer from the first software interface presented on the first display;
 adding the second printing task to the printing task queue of the second target printer; and
 re-enable the writing access to the printing task queue of the second target printer from the first software interface presented on the first display.

14. The computer-implemented method of claim 13, wherein disabling writing access to the printing task queue of the first target printer comprises:
 denying a request to make changes to the printing task queue of the first target printer; and
 requesting a resend of the denied request after a predetermined time.

15. The computer-implemented method of claim 13, further comprising:
 removing the current printing task from the printing task queue of the first target printer.

16. The computer-implemented method of claim 15, further comprising:
 printing another printing task in the printing task queue of the first target printer with an earliest timestamp, until no printing task remains in the printing task queue of the first target printer.

17. The computer-implemented method of claim 13, wherein the first and the second software interface each is configured to present one or more input fields, the one or more input fields being configured to accept non-keyboard inputs.

18. A computer-implemented system for providing printing service by a multi-display device, the system comprising:
 one or more memory devices storing instructions;
 a first display configured to generate a first printing task via a first software interface;
 a second display configured to generate a second printing task via a second software interface;
 at least one printer; and
 one or more processors, communicatively coupled to the first display, the second display, and the at least one printer, configured to execute the instructions to perform operations comprising:
  establishing and maintaining a printing task queue storing printing tasks for each of the at least one printer;
  receiving a first printing task from the first software interface associated with a first timestamp;
  determining a first target printer for the first printing task, the first target printer is one of the at least one printer;
  disabling writing access to the printing task queue of the first target printer from the second software interface presented on the second display by:
   denying a request to make changes to the printing task queue of the first target printer; and
   requesting a resend of the denied request after a predetermined time;
  adding the first printing task and its associated target printer to the printing task queue of the first target printer;

re-enable the writing access to the printing task queue of the first target printer from the second software interface presented on the second display;

printing a current printing task from the first target printer, the current printing task is a printing task in the printing task queue of the first target printer with an earliest timestamp;

removing the current printing task from the printing task queue of the first target printer;

printing another printing task in the printing task queue of the first target printer with an earliest timestamp, until no printing task remains in the printing task queue of the first target printer;

receiving a second printing task from the second software interface associated with a second timestamp;

determining a second target printer for the second printing task, the second target printer is the same as the first target printer;

disabling writing access to the printing task queue of the second target printer from the first software interface presented on the first display by:

denying a request to make changes to the printing task queue of the second target printer; and requesting a resend of the denied request after a predetermined time;

adding the second printing task and its associated target printer to the printing task queue of the second target printer;

re-enable the writing access to the printing task queue of the second target printer from the first software interface presented on the first display;

printing a current printing task from the second target printer, the current printing task is a printing task in the printing task queue of the second target printer with an earliest timestamp;

removing the current printing task from the printing task queue of the second target printer;

printing another printing task in the printing task queue of the second target printer with an earliest timestamp, until no printing task remains in the printing task queue of the second target printer.

* * * * *